Nov. 15, 1927.
G. W. BLANK
BUTTON
Filed Feb. 17, 1927
1,649,765
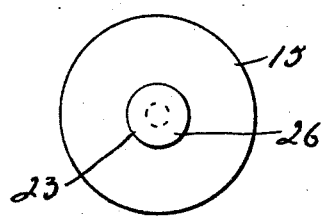
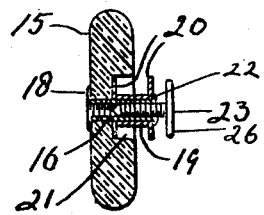
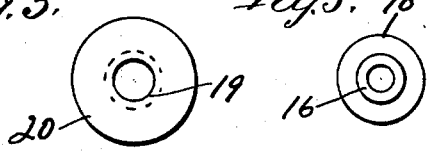
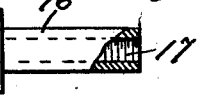
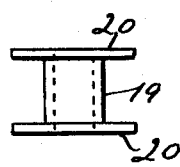
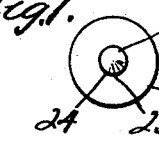
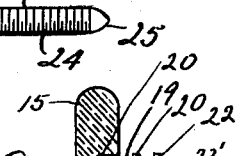
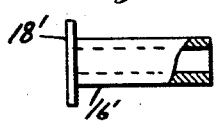
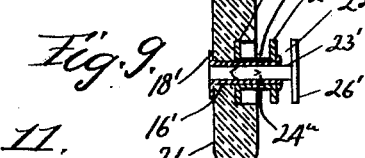
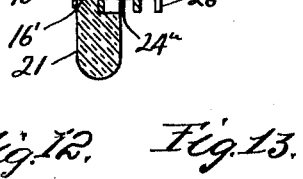
Inventor
George W. Blank Patented Nov. 15, 1927.

UNITED STATES PATENT OFFICE.

GEORGE W. BLANK, OF PHILADELPHIA, PENNSYLVANIA.

BUTTON.

Application filed February 17, 1927. Serial No. 168,986.

My invention relates to new and useful improvements in a button, and has for its primary object the construction of a device of this character which will be simple and inexpensive in the cost of manufacture, though strong, durable and efficient in operation.

Another object of the invention is to provide a button having a flexible head and a shank of unique construction including means to attach it to the fabric of a garment without sewing, riveting or the like.

A further object of the invention is to provide for detachably fastening the button to a garment.

A still further object of my invention is to produce a structure which automatically adjusts itself to varying thicknesses of garment fabrics, thus eliminating the necessity of manufacturing different-sized buttons.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is an inner face view of a button constructed in accordance with my invention.

Fig. 2, is a sectional view thereof.

Fig. 3, is an end view of the sleeve.

Fig. 4, is a side elevation of the sleeve.

Fig. 5, is an end view of the hollow rivet.

Fig. 6, is a side elevation of the rivet with a portion broken away and shown in section to illustrate the interior thereof.

Fig. 7, is an end view of the stud.

Fig. 8, is a side elevation of the stud.

Fig. 9, is a sectional view similar to Fig. 2, showing a modified construction of the button.

Fig. 10, is an end view of the rivet used in the modification.

Fig. 11, is a side elevation, partly in section of the rivet shown in Figs. 10 and 11.

Fig. 12, is a side elevation of the stud used in the modification.

Fig. 13, is an end view of the stud in Fig. 12.

In carrying out my invention as herein embodied, 15 represents the head of the button, and while I have illustrated it as being formed of a rubber disc for flexibility, it is to be understood that I may, under some conditions, utilize metal, bone or other hard substance.

Rubber has many advantages over other materials because it is compressible and flexible, and therefore, buttons with rubber heads will not be broken during laundrying of the garments to which such buttons are attached, and they are more comfortable to the wearer because they are soft and unlikely to cause an injury.

The head is illustrated in rather exaggerated thickness, but this has been done to clearly illustrate the feature of the automatic adjustment of the button to different thicknesses of garment fabrics as will be presently described.

As shown in Fig. 2, a hollow rivet 16 having interior threads 17 is passed through the head 15 until the rivet flange 18 engages the outer face of the head. Over the projecting end of the rivet is placed a sleeve 19, having a flange 20 at each end, and the flange at the inner end preferably sets in a recess 21 formed in the head concentric with the hole through which the rivet passes. The end of the rivet 16 at the outer end of the sleeve is turned over or riveted, as at 22, thus securing the aforementioned parts together.

To fasten the button to an object, a stud 23 is provided and which includes an exteriorly threaded body 24 having a piercing point 25 at one end and a head 26 at the other end. The stud is first forced through the fabric of the garment to which the button is to be attached by piercing said fabric with the pointed end and then the rivet 16 is screwed on to the stud until the fabric is clamped between the outer flange of the sleeve 19 and the head of the stud.

In use the overlapping or companion part of the garment which is provided with a buttonhole is passed over the head of the button and rests in the space between the adjacent faces of the sleeve. If the fabric of the garment is thin, it will readily rest in the space above mentioned, but if the fabric is thicker than the dimensions of this space the head of the button when of flexible or compressible material will be flexed or compressed sufficiently to accommodate the thicker material, thus automatically adjusting itself to varying thicknesses of garment fabrics.

The structure illustrated in Fig. 9, is the same as the above with the exception of the rivet 16′ which while being provided with a flange 18′ at one end has a plain interior or bore for the reception of the stud 23′. Said stud 23′ includes a body 24′ provided with a piercing point 25′ at one end and a head 26′ at the other end. The body has a plurality of barbs 24ª disposed about it, and said barbs will be embedded in the walls of the rivet 16′ when the stud is inserted in said rivet thus preventing accidental withdrawal of the stud.

The operation of the modification is quite similar to the preferred construction, and the stud is first inserted through the garment fabric, and the rivet then forced over the body of said stud until the fabric is clamped between the outer flange of the sleeve and the rivet head 26′.

Of course I do not wish to be limited to the exact details of construction as herein shown as these may be varied within the limits of the appended claims without departing from the spirit of my invention.

Having thus fully described my invention, what I claim as new and useful is:

1. A button comprising a head, a hollow rivet passed through said head, a sleeve surrounding a portion of the rivet and fixed thereon to hold the head and rivet together, and a stud connected with the rivet.

2. A button consisting of a head, a hollow rivet extending through the head and having an end protruding from the head, a sleeve fixed on the protruding end of the rivet between a face of the head and the turned over or riveted end of said rivet, a stud inserted in the hollow rivet, and means to detachably connect the stud to said rivet.

3. The structure set forth in claim 2, wherein the button head is recessed to receive one end of the sleeve and the means for detachably connecting the stud to the rivet consisting of threads in said rivet and on said stud.

4. A button comprising a head of flexible material, a hollow rivet having a head at one end and adapted to be turned over at the other end of said rivet passing through the button head and being interiorly threaded, a sleeve having heads at both ends mounted upon the rivet and held in place by the turned over end, and a threaded stud provided with a pointed end and a head at the opposite end, said stud head and the outer flange of the sleeve forming means to clamp the button on the fabric.

5. A button comprising a rubber button head having a recess, a hollow rivet passing through the button head concentric of the recess, a flanged sleeve on the rivet with one end in the recess, said sleeve being held in place between the inner face of the button head and a turned over or riveted end of the rivet, and a pointed stud mounted in the rivet and having a head coacting with a flange of the sleeve to clamp the button on an object.

6. The structure set forth in claim 5 wherein the stud has threaded connection with the rivet.

In witness whereof, I have hereunto affixed my signature.

GEORGE W. BLANK.